US011327859B1

(12) United States Patent
Pavlovskii et al.

(10) Patent No.: US 11,327,859 B1
(45) Date of Patent: May 10, 2022

(54) CELL-BASED STORAGE SYSTEM WITH FAILURE ISOLATION

(71) Applicant: Amazon Technologies, Inc., Seattle, WA (US)

(72) Inventors: Stanislav Pavlovskii, Sammamish, WA (US); Jacob Carr, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 16/134,837

(22) Filed: Sep. 18, 2018

(51) Int. Cl.
  *G06F 11/20* (2006.01)
(52) U.S. Cl.
  CPC .... *G06F 11/2094* (2013.01); *G06F 2201/805* (2013.01); *G06F 2201/82* (2013.01)
(58) Field of Classification Search
  CPC .......... G06F 11/2094; G06F 2201/805; G06F 2201/82
  See application file for complete search history.

(56) References Cited

U.S. PATENT DOCUMENTS

| 9,722,932 B1 | 8/2017 | Brandwine |
| 9,934,273 B1 | 4/2018 | MacCarthaigh |
| 9,940,474 B1 | 4/2018 | Franklin et al. |
| 9,998,955 B1 | 6/2018 | MacCarthaigh |
| 2011/0289344 A1* | 11/2011 | Bae ........................ G06F 11/202 714/4.2 |
| 2015/0100826 A1* | 4/2015 | Vujic .................... G06F 9/5083 714/37 |
| 2017/0161160 A1* | 6/2017 | Helmick ............. G06F 11/2028 |
| 2018/0121285 A1* | 5/2018 | Olds ...................... G06F 3/067 |
| 2019/0044819 A1* | 2/2019 | Reddy ................. H04L 67/1097 |
| 2020/0026446 A1* | 1/2020 | Jawahar ............... G06F 3/0607 |
| 2020/0034257 A1* | 1/2020 | Mahmood ............ G06F 11/008 |

OTHER PUBLICATIONS

Colm MacCarthaigh, "Shuffle Sharding: Massive and Magical Fault Isolation," AWS Architecture Blog, Amazon.com, Apr. 2014.
Todd Hoff, "Cell Architectures," HighScalability.com, May 2012.

* cited by examiner

*Primary Examiner* — Bryce P Bonzo
*Assistant Examiner* — Michael Xu
(74) *Attorney, Agent, or Firm* — Robert C. Kowert; Kowert, Hood, Munyon, Rankin & Goetzel, P.C.

(57) ABSTRACT

Methods, systems, and computer-readable media for a cell-based storage system with failure isolation are disclosed. A first subset of storage nodes is selected from a set of storage nodes of a data store and assigned to a first partition of data. Replicas of the first partition are stored using the first subset. A second subset of storage nodes is selected from the set of storage nodes and assigned to a second partition of data. The second subset is selected based (at least in part) on the membership of the first subset, and the second subset comprises at least one node not present in the first. Replicas of the second partition are stored using the second subset. Access requests associated with the first partition are routed to the first subset of storage nodes. Access requests associated with the second partition are routed to the second subset of storage nodes.

20 Claims, 8 Drawing Sheets

CELL-BASED STORAGE SYSTEM WITH FAILURE ISOLATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. For example, a variety of storage services may be provided to clients using shared resources. When a storage service is used by multiple clients, a failure attributed to one client may affect other clients by making their storage resources inaccessible or otherwise degrading their experience.

Figure 1A:
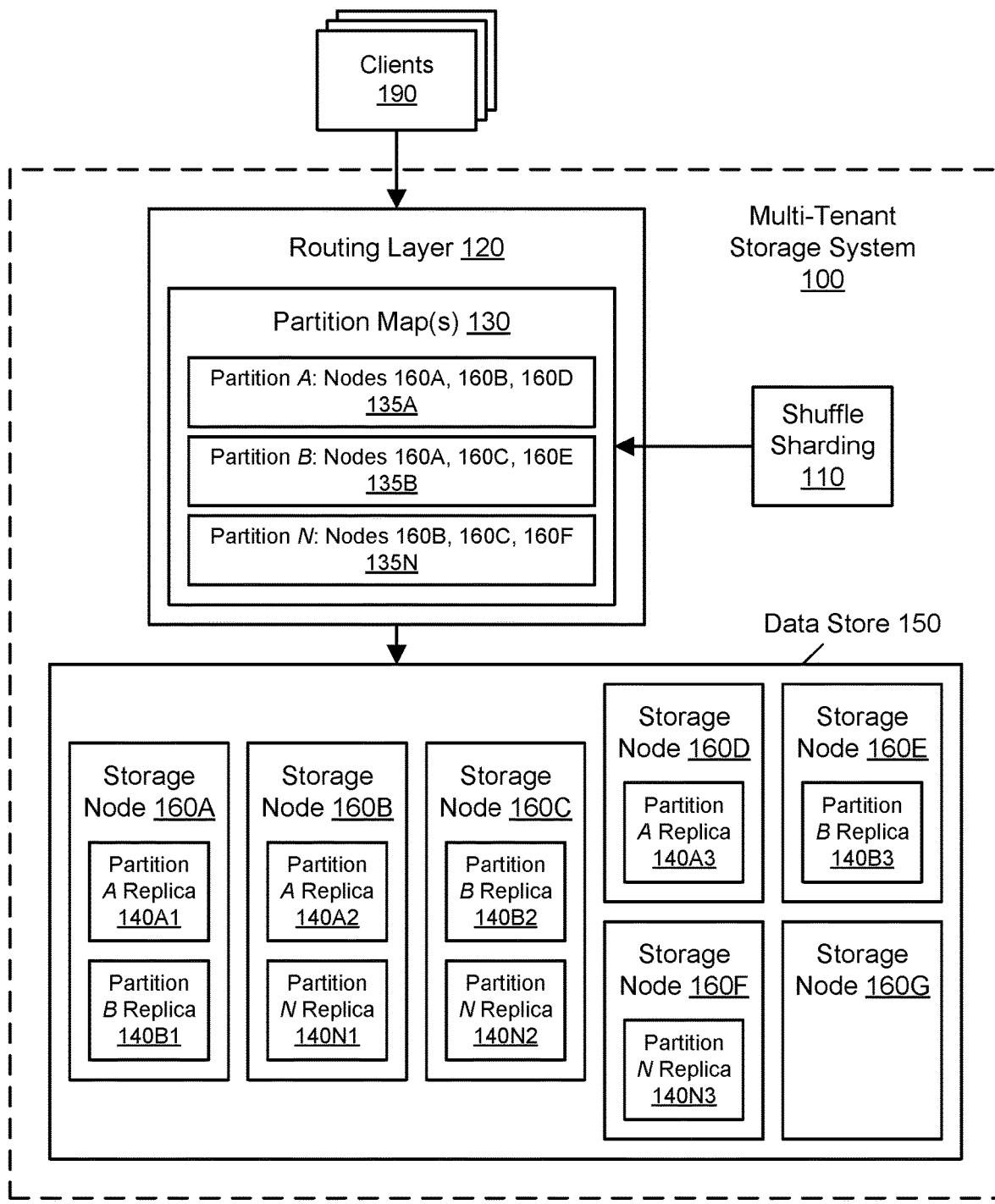
FIG. 1A and FIG. 1B illustrate an example system environment for a cell-based storage system with failure isolation, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a cell-based storage system with failure isolation are described. In some embodiments, storage resources used to implement a distributed, multi-tenant data store may be partitioned such that a failure for one partition may not make other partitions inaccessible. The data store may store tables, and tables may include partitions. In one embodiment, each partition may be represented in the storage resources with a set of replicas (e.g., three replicas) on a corresponding number of storage nodes, and a quorum consistency model may be used to determine the results of access requests from clients (e.g., using two of three replicas). In one embodiment, using the quorum consistency model, the customer experience may be based on the best-performing replicas and not necessarily on the worst-performing replica(s). In one embodiment, storage nodes may be assigned to partitions using a shuffle sharding technique to implement a cell-based architecture. Using shuffle sharding, a set of storage nodes may be selected for a partition such that the overlap in membership with other sets of storage nodes for other partitions is restricted. In one embodiment, for example, the overlap may be limited to no more than one storage node in common for any other particular partition. Storage nodes may be maintained in different data centers and/or availability zones, and in one embodiment, nodes selected for a partition may be distributed across the data centers and/or zones for enhanced reliability. By limiting the overlap in storage nodes between different partitions, the failure of one partition may not render another partition inaccessible. For example, if a first partition becomes "hot" and begins to experience a very large quantity of access requests, but the partition has only one storage node in common with a second partition based on shuffle sharding, then the second partition may remain accessible using its other storage nodes based on the quorum consistency model. Using the techniques described herein, the customer experience may be improved in a multi-tenant data store by improving availability and reliability and reducing latency.

In one embodiment, the distributed storage system described herein may use a cell-based architecture to achieve a degree of failure isolation for storage clients and thus improve the experience for clients. In one embodiment, the cell-based architecture may distribute the functionality of a storage system among a plurality of cells, where computational and storage resources of one cell may be independent of those of another cell. In one embodiment, the cell-based architecture may permit additional cells to be added or existing cells to be deleted, e.g., even while the system is live. In one embodiment, the cell-based architecture may isolate failure to one cell such that other cells are not adversely impacted by the failure. In one embodiment, for example, the failure may be caused by a particular client sending an excessive amount of access requests in a short period of time. In one embodiment, as another example, the failure may be caused by a "poison request" that triggers a cascading system failure as one failed system fails over into the next.

As one skilled in the art will appreciate in light of this disclosure, embodiments may be capable of achieving certain technical advantages, including some or all of the following: (1) improving the availability of a multi-tenant data store by isolating failures within cells; (2) improving the reliability of a multi-tenant data store by distributing storage resources across different data centers and/or availability zones and isolating failures within those centers or zones; (3) reducing the latency of accessing a multi-tenant data store by isolating failures; (4) reducing the latency of accessing a multi-tenant data store by reducing contention on shared storage resources; (5) reducing the incidence of idle computational and storage resources by allowing multi-tenancy while providing fault tolerance through a cell-based architecture; and so on.

FIG. 1A illustrates an example system environment for a cell-based storage system with failure isolation, according to one embodiment. A multi-tenant storage system 100 may provide storage on behalf of a plurality of clients 190. The storage system 100 may maintain a data store 150 using distributed storage resources. In one embodiment, the storage resources may include storage nodes. As shown in the example of FIG. 1A, the storage nodes may include nodes 160A, 160B, 160C, 160D, 160E, 160F, 160G, and so on. However, it is contemplated that the data store 150 may include any suitable number and configuration of storage nodes or other storage resources. In one embodiment, a storage node may include computational resources (e.g., one or more processors) and persistent storage resources. In one embodiment, any one of the storage nodes 160A-160G may be substantially independent of the other storage nodes, e.g., such that the computational and storage resources of the nodes are separate and distinct from one another. In various embodiments, the storage nodes may be homogeneous or heterogeneous in terms of their hardware capabilities and software configurations. In some embodiments, the storage nodes may be allocated to data objects and/or clients using a cell-based architecture to achieve fault tolerance from client to client or data object to data object.

Figure 1B:
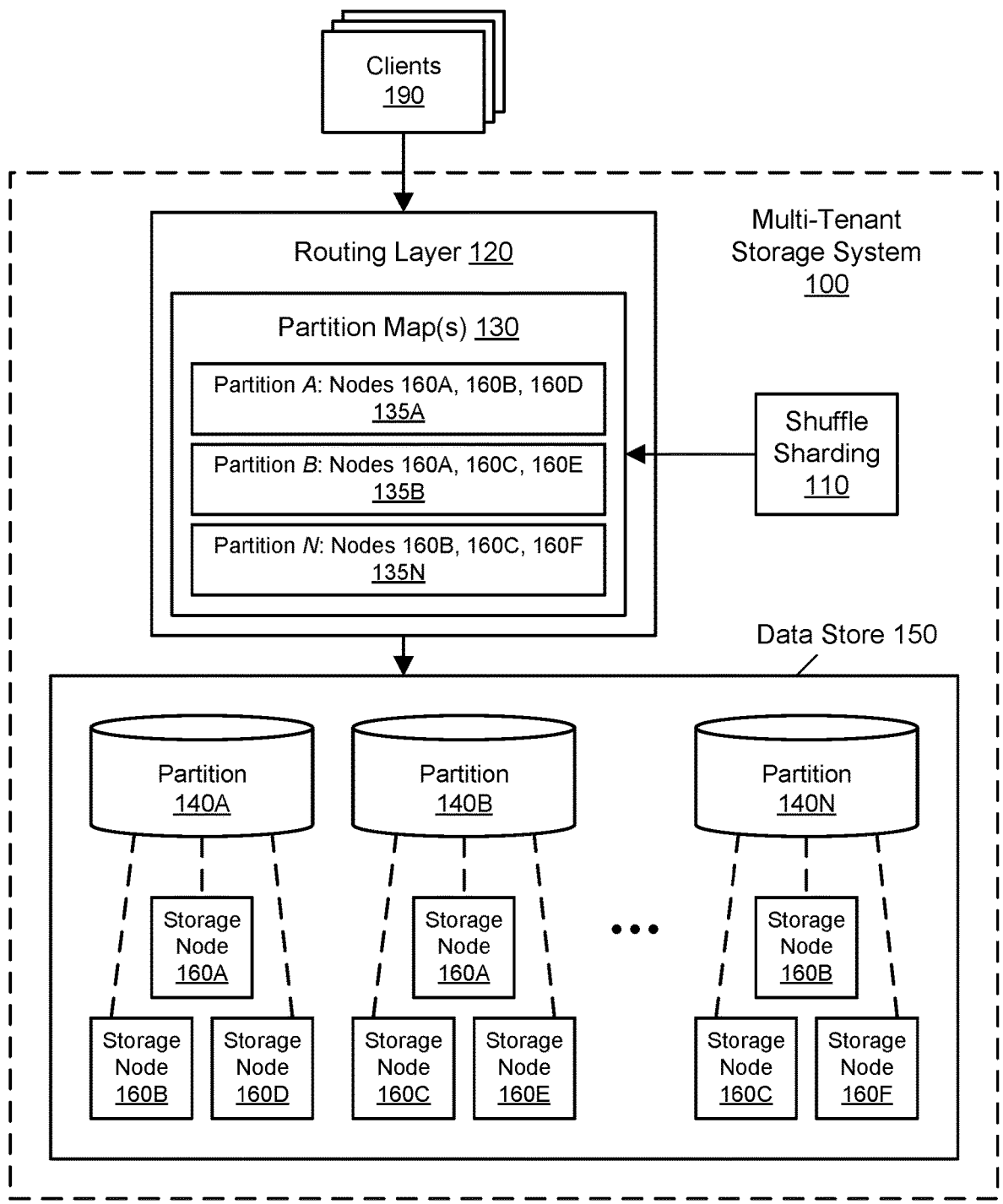

The data store 150 may be implemented using one or more distributed hash tables (DHTs). In some embodiments, the data store 150 may represent multiple data stores that are implemented using one or more data storage subsystems, services, or technologies. The data store 150 may store data objects such as tables, partitions, indices, and/or other database objects. In one embodiment, a table may include one or more partitions. In one embodiment, a collection of tables that are associated in some manner may be grouped as a data set, e.g., based on input from the clients 190. A partition may represent a collection of data elements, e.g., key-value pairs or rows. Partitions may represent logical entities. FIG. 1B illustrates further aspects of the example system environment for a cell-based storage system with failure isolation, including a logical view of the data store, according to one embodiment. As shown in the example of FIG. 1B, the data store 150 may include partitions 140A and 140B through 140N. However, it is contemplated that the data store 150 may include any suitable number and configuration of partitions.

In one embodiment, each partition may be implemented in the data store using a set of replicas. For example, a partition may be backed up with three replicas. In one embodiment, each replica may be stored using a different storage node to achieve a degree of failure tolerance. For example, a partition may use a first storage node for a first replica, a second node for a second replica, and a third node for a third replica. In one embodiment, the storage system 100 may use a quorum consistency model. Using the quorum consistency model, read requests and write requests for a partition may be served using a quorum of the replicas for that partition. In one embodiment, the quorum may be defined as a majority or super-majority or other sufficient pre-determined percentage of the replicas. For example, if a partition is backed by three replicas, then two of the three replicas may represent a quorum. As a further example, if a read request for a key is sent by one of the clients 190 to the system 100, then the system may determine the partition of the key, determine the storage nodes that store replicas for the partition, route read requests to those nodes, and generate a response to the client when a quorum of the nodes have responded. In one embodiment, a single failed or inaccessible node may not render a partition inaccessible as long as a quorum of nodes remain operational for that partition. In one embodiment, the failure of a node may be due to hardware error or software error that may render the node completely inaccessible for requests. In one embodiment, the failure of a node may be due to high contention on the node associated with a large quantity of requests from one or more clients, and the high contention may render the node very slow to respond to some requests or unable to respond to some requests. Using the quorum consistency model, the customer experience may be based on the best-performing replicas for a data object and not necessarily on the worst-performing replica(s), such that the data object may be read from or written to even if one of its replicas is inaccessible or experiencing a high latency.

In one embodiment, a particular storage node may store replicas or other data associated with different tables, partitions, or other data objects. In some embodiments, the partitions 140A-140N or other data objects in the data store 150 may be owned or managed by different entities, teams, or other divisions within a particular enterprise or even by different business entities. For example, in an enterprise that operates an online store offering products and/or services from one or more vendors, one partition or table may be associated with an order processing team, another partition or table may be associated with an inventory management team, another partition or table may be associated with authorization credentials, and so on. In one embodiment, an item or record associated with a particular product or service may suddenly become "hot" when a large volume of requests associated with that product or service are received by the system 100, e.g., due to an offer associated with the product or service. In one embodiment, an entire partition may become hot for similar reasons. Using prior approaches, due to a lack of sufficient isolation of replicas and their corresponding storage nodes, unrelated partitions could experience high latency or unavailability if a hot item or hot partition caused a large quantity of access requests.

In one embodiment, storage nodes may be assigned to partitions or other data objects using a shuffle sharding technique 110 to implement a cell-based architecture that achieves a higher degree of failure isolation than prior approaches. Using shuffle sharding 110, a set of storage nodes may be selected for a partition such that the overlap in membership with other sets of storage nodes for other partitions is minimized or restricted. For example, if three nodes are selected for a given partition, then the overlap may be limited to no more than one storage node in common with any other given partition. In one embodiment, the shuffle sharding 110 may use random or pseudo-random selection techniques to assign storage nodes to partitions or other data objects. In one embodiment, for example, the shuffle sharding 110 may randomly or pseudo-randomly select nodes 160A, 160B, and 160D to store replicas 140A1, 140A2, and 140A3 for a first partition 140A. In one embodiment, the shuffle sharding 110 may analyze the degree of overlap of a candidate set of nodes with existing sets of nodes. If a candidate set or an individual node selection represent an excessive overlap, then the shuffle sharding 110 may discard that candidate set or individual node selection and select another set or node, e.g., using random or pseudo-random techniques.

When selecting the set of nodes for a second partition 140B, the shuffle sharding 110 may take into consideration the membership of other sets of nodes for other partitions. As further shown in the example of FIG. 1A and FIG. 1B, the shuffle sharding 110 may select nodes 160A, 160C, and 160E to store replicas 140B1, 140B2, and 140B3 for a second partition 140B in light of the previous selection made for partition 140A. The set of nodes selected for partition 140B may have no more than one overlapping node (in this case, node 160A) with partition 140A. In one embodiment, a candidate selection of node 160B for partition 140B may be discarded because it would represent a second overlapping node with partition 140A. In a similar manner, the shuffle sharding 110 may select nodes 160B, 160C, and 160F to store replicas 140N1, 140N2, and 140N3 for a third partition 140N in light of the previous selections made for partitions 140A and 140B. The set of nodes selected for partition 140C may have no more than one overlapping node (in this case, node 160B) with partition 140A and no more than one overlapping node (in this case, node 160C) with partition 140B. As will be discussed below with respect to FIG. 4 and FIG. 5, the shuffle sharding 110 may select nodes that are distributed across different physical locations in order to provide additional reliability. For example, for a particular partition, the shuffle sharding 110 may select one storage node from a set of nodes at one location, a second storage node from a set of nodes at a second location, and a third storage node from a set of nodes at a third location. In one embodiment, the degree of permissible overlap between two sets of storage nodes may be customized or altered. For example, the maximum overlap may be increased based (at least in part) on user input by a client that wishes to pay a lower cost while exposing the client's storage resources to a higher risk of failure. Conversely, the maximum overlap may be decreased based (at least in part) on user input by a client that wishes to expose the client's storage resources to a lower risk of failure, potentially at a higher cost assessed to the client.

In one embodiment, the shuffle sharding 110 may generate or add to one or more partition maps 130 when selecting nodes for a partition. The partition map(s) 130 may also be referred to as routing tables. As shown in FIG. 1A and FIG. 1B, the shuffle sharding may 110 may generate a mapping 135A of partition 140A to its corresponding nodes 160A, 160B, and 160D; a mapping 135B of partition 140B to its corresponding nodes 160A, 160C, and 160E; and a mapping 135N of partition 140N to its corresponding nodes 160B, 160C, and 160F. The partition map(s) 130 may be used by a routing layer 120 of the storage system 100 to route access requests to storage resources. For example, if a read request is received from one of the clients 190 for a particular key, then the routing layer may determine the partition in which that key is stored, determine the storage nodes assigned to store replicas of that partition, and then route read requests to the storage nodes. In one embodiment, the routing layer 120 may use hashing techniques to identify the targets of requests. In one embodiment, the routing layer 120 or another component of the storage system 100 may marshal responses from the individual storage nodes according to the quorum consistency model in order to generate a final response to the client. In one embodiment, by using the routing layer 120 and by implementing the quorum consistency model within the storage system 100, client software of clients 190 need not necessarily be modified to take advantage of the cell-based architecture, e.g., to add retry logic for failed nodes. By limiting the overlap in storage nodes between different partitions using shuffle sharding 110 and a cell-based architecture, the failure of one partition may not render another partition inaccessible. An example of a failure scenario is discussed below with respect to FIG. 3.

Figure 2:
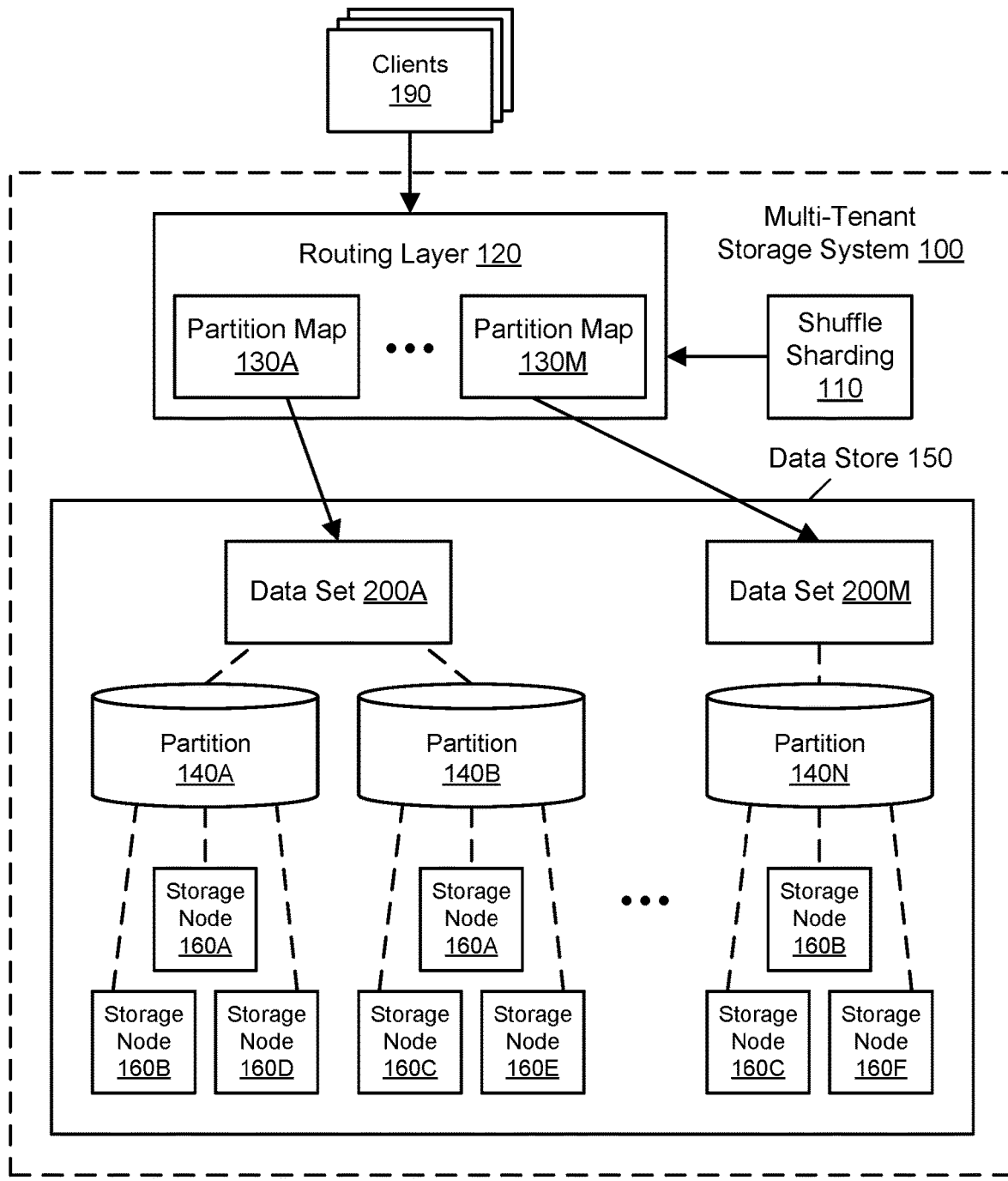
FIG. 2 illustrates further aspects of the example system environment for a cell-based storage system with failure isolation, including the use of data-set-specific partition maps, according to one embodiment.

FIG. 2 illustrates further aspects of the example system environment for a cell-based storage system with failure isolation, including the use of data-set-specific partition maps, according to one embodiment. In one embodiment, a plurality of partition maps 130 may be separated according to data sets. As discussed above, a data set may represent a collection of related tables, e.g., as identified by the clients 190. As shown in the example of FIG. 2, the data store 150 may represent data sets 200A through 200M, where partitions 140A and 140B are related in some manner and grouped under data set 200A, while partition 140N is grouped under a different data set 200M. In one embodiment, partition maps 140 may be specific to particular data sets. For example, the partitions in data set 200A may be accessible via one partition map 130A, and the partitions in data set 200M may be accessible via another partition map 130M. In one embodiment, a new partition map may be generated when a new data set is identified. The separation of partition mapping according to different data sets may yield additional reliability, e.g., such that a large volume of requests may not render the entire routing layer 120 unusable for unrelated data objects. In one embodiment, storage nodes may be shuffle sharded within a data set associated with a particular partition map. In one embodiment, the table associated with an incoming request may be used to determine its data set, and the partition map specific to that data set may be used to route the request to the storage nodes.

Figure 7:
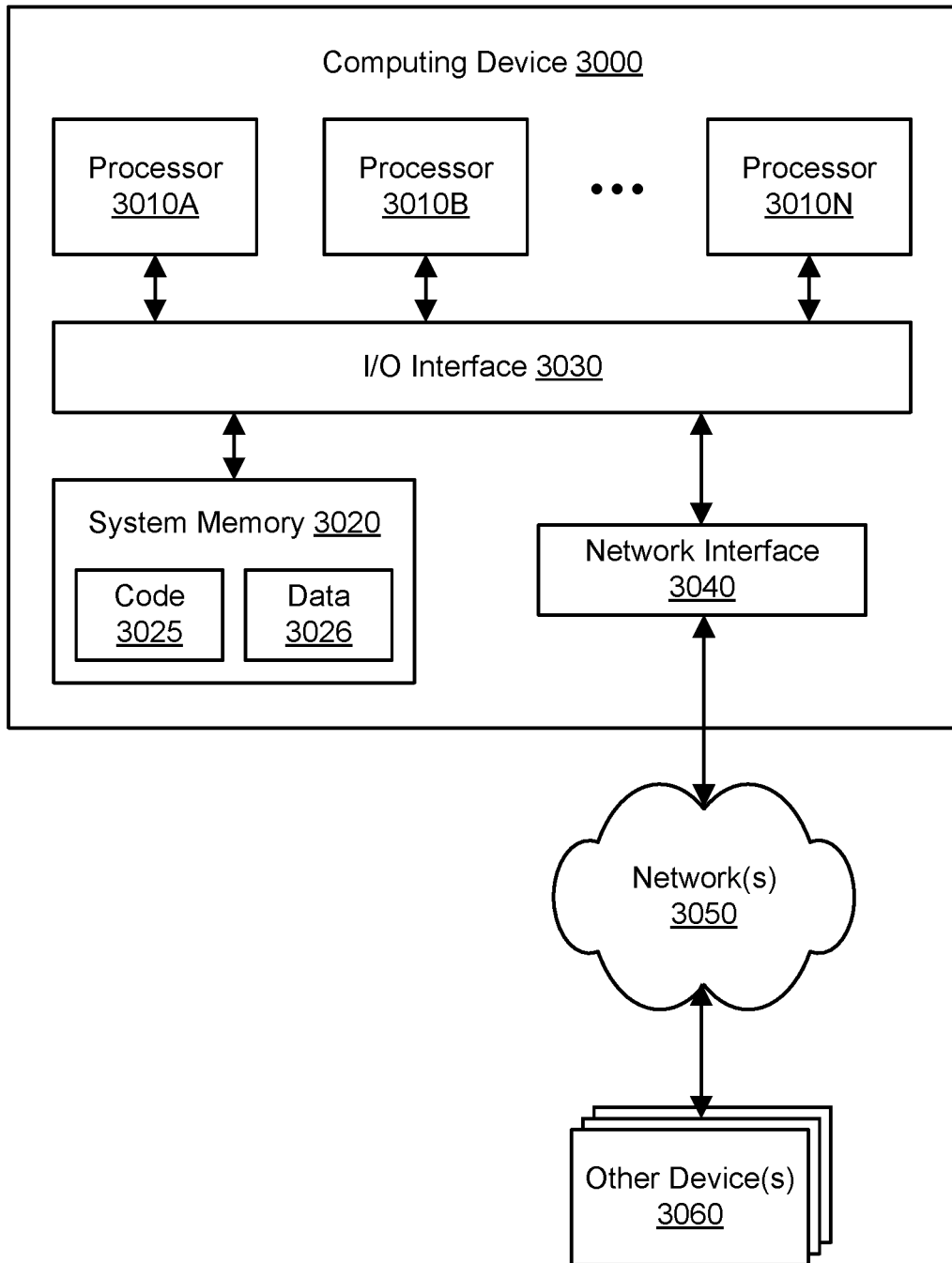
FIG. 7 illustrates an example computing device that may be used in some embodiments.

The storage system 100 may be implemented using any suitable number and configuration of computing devices, any of which may be implemented by the example computing device 3000 illustrated in FIG. 7. Clients 190 may represent or be associated with computing devices such as the example computing device 3000 shown in FIG. 7. The clients 190 may represent clients of a storage service that maintains the data store 150. The computing devices of the storage system 100 and/or clients 190 may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

The storage system 100, data store 150, routing layer 120, and/or shuffle sharding 110 may be implemented in a service-oriented system in which multiple services collaborate according to a service-oriented architecture. In such an environment, the storage system 100, data store 150, routing layer 120, and/or shuffle sharding 110 may offer their functionality as a service to multiple clients. To enable clients to invoke their functionality, the storage system 100, data store 150, routing layer 120, and/or shuffle sharding 110 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In some embodiments, the functionality of the storage system 100, data store 150, routing layer 120, and/or shuffle sharding 110 may be offered to clients in exchange for fees, or the cost associated with operating the storage system 100, data store 150, routing layer 120, and/or shuffle sharding 110 may be assessed to a responsible entity.

Components of the storage system 100 and the clients 190 may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100, such as the data store 150, may be implemented using computing resources of a provider network. A provider network may represent a network set up by an entity such as a business or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 3:
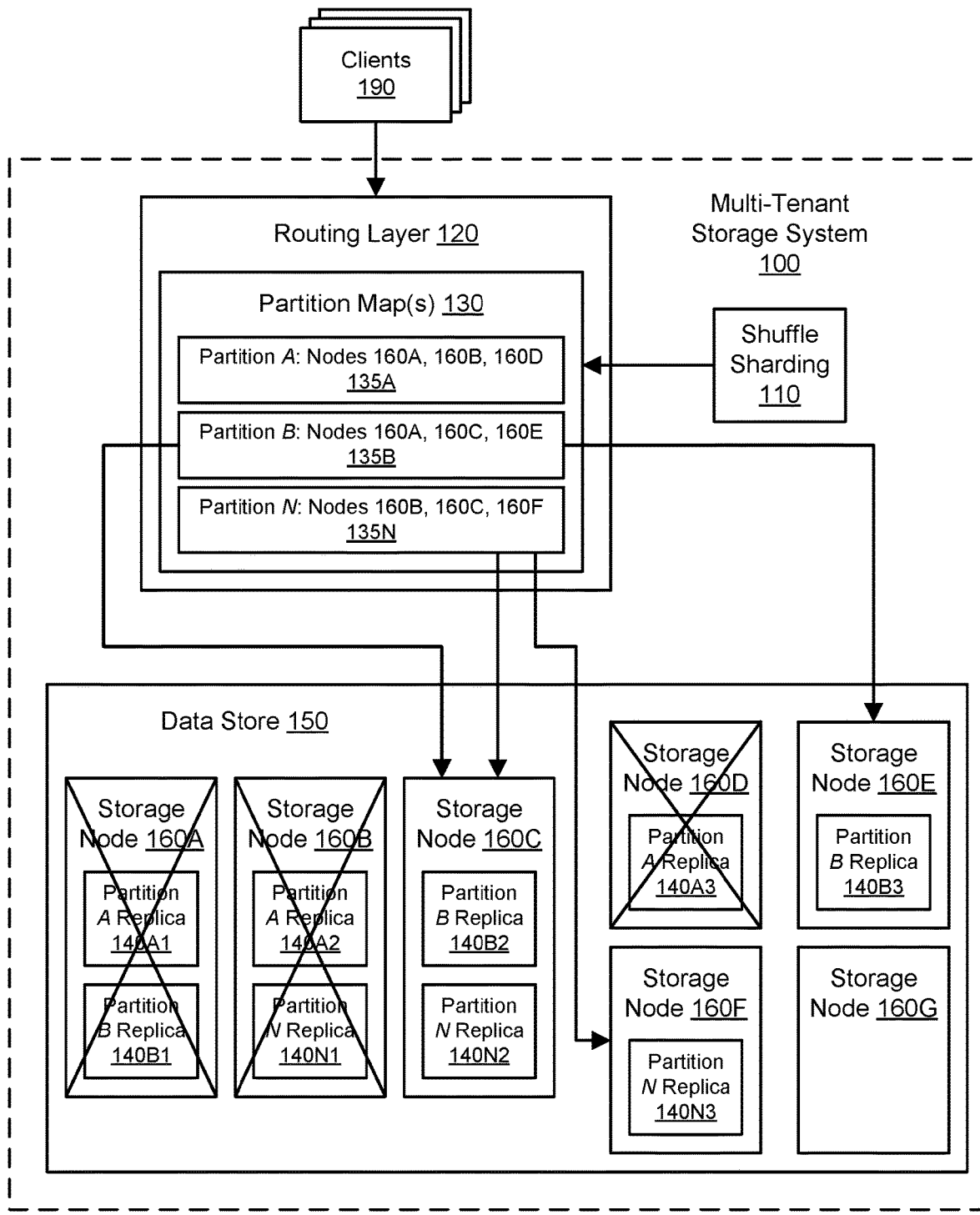
FIG. 3 illustrates further aspects of the example system environment for a cell-based storage system with failure isolation, including a failure scenario in which the failure of one partition does not make other partitions inaccessible, according to one embodiment.

FIG. 3 illustrates further aspects of the example system environment for a cell-based storage system with failure isolation, including a failure scenario in which the failure of one partition does not make other partitions inaccessible, according to one embodiment. Using the quorum consistency model, the customer experience may be based on the best-performing replicas for a data object and not necessarily on the worst-performing replica(s), such that the data object may be read from or written to even if one of its replicas is inaccessible or experiencing a high latency. As discussed above, storage nodes in the data store 150 may experience failure for a variety of reasons. Using the cell-based architecture described herein, a single failed or inaccessible node may not render a partition inaccessible as long as a quorum of nodes remain operational for that partition. In one embodiment, the failure of a node may be due to hardware error or software error that may render the node completely inaccessible for requests. In one embodiment, the failure of a node may be due to high contention on the node associated with a large quantity of requests from one or more clients, and the high contention may render the node very slow to respond to some requests or unable to respond to some requests. The failure may be attributable to one or more particular keys or items within the data store 150 or to an entire partition.

By limiting the overlap in storage nodes between different partitions, the failure of one partition may not render another partition inaccessible. As shown in the example failure scenario of FIG. 3, a first partition 140A may become "hot" and begin to experience a very large quantity of access requests. Accordingly, in this example, all of the storage nodes 160A, 160B, and 160D that store replicas for the partition 140A may be affected negatively. For example, the nodes 160A, 160B, and 160D may begin to drop requests or respond to requests with a high latency. By employing shuffle sharding 110 along with a quorum consistency model, the second partition 140B may have only one storage node 160A in common with the first partition 140A, and the unaffected nodes 160C and 160E may continue to provide a quorum for requests associated with the second partition 140B. Similarly, the third partition 140N may have only one storage node 160B in common with the first partition 140A, and the unaffected nodes 160C and 160F may continue to provide a quorum for requests associated with the third partition 140N.

In one embodiment, the storage system 100 may implement live migration of replicas among storage nodes. Using live migration, a partition or data object may be reassigned and migrated to a different set of storage nodes without taking the system 100 offline for all clients 190. Live migration may be used, for example, if an administrator of the system 100 has advance notice that particular data or a particular partition is expected to experience a rapid increase in access requests. For example, if a partition represents a catalog of products and/or services offered through an online store, then a sales team may inform the system 100 in advance so that the system 100 can migrate the corresponding replicas to higher-performance resources, add additional replicas using additional storage nodes, add the affected data to a cache layer, and so on. In one embodiment, the hash ranges used by the routing layer 120 may be changed to reduce the impact on unrelated partitions, e.g., by modifying a hash range with an expected "hot" partition to cover a smaller portion of the data store 150. Live migration may be used to further enhance the improvements to availability, reliability, and latency offered by the cell-based architecture of the storage system 100.

Figure 4:
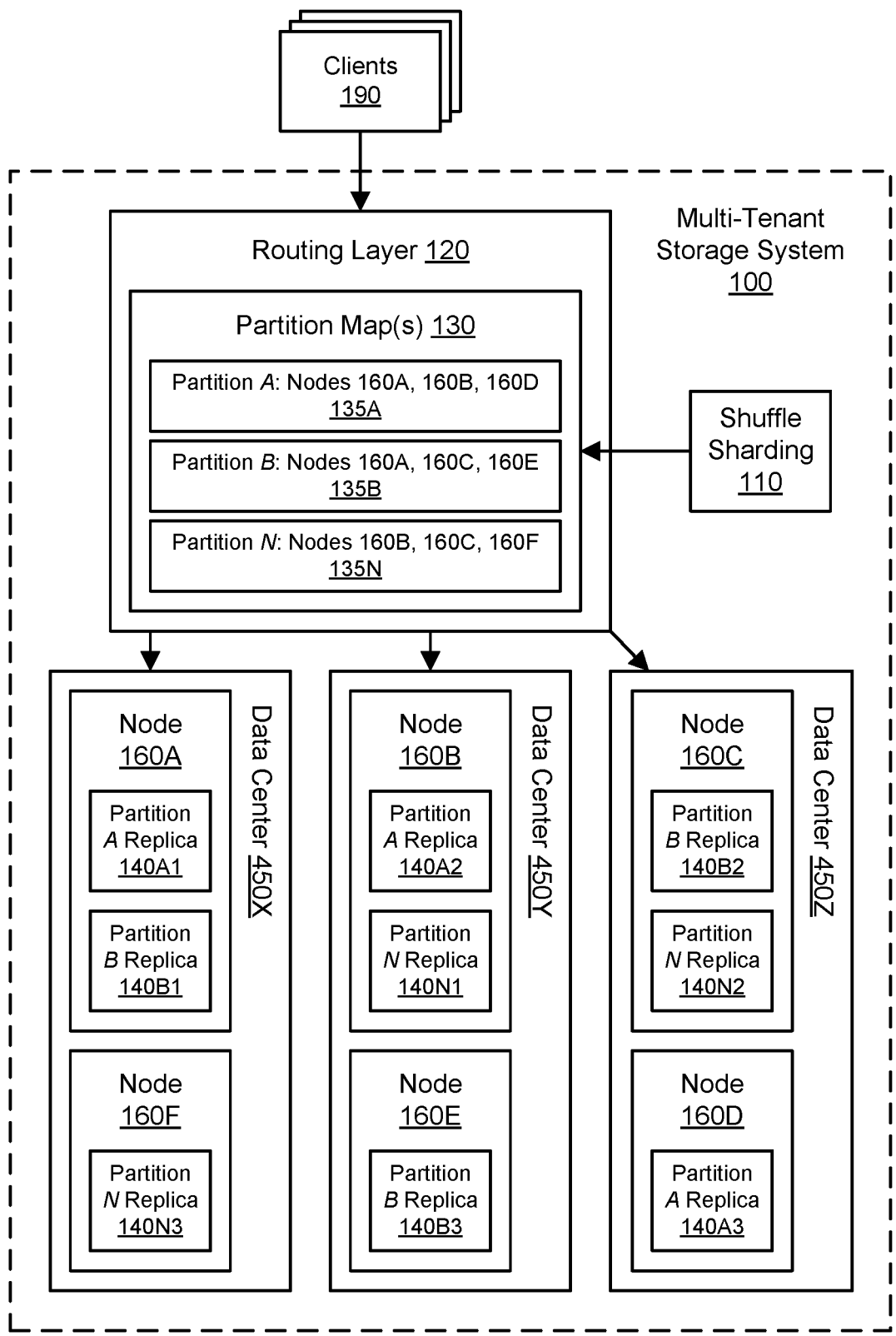
FIG. 4 illustrates further aspects of the example system environment for a cell-based storage system with failure isolation, including the distribution of storage nodes across different data centers for fault tolerance, according to one embodiment.

FIG. 4 illustrates further aspects of the example system environment for a cell-based storage system with failure isolation, including the distribution of storage nodes across different data centers for fault tolerance, according to one embodiment. Storage nodes 160A-160F may be maintained in different data centers. For example, nodes 160A and 160F may be located in one data center 450X, nodes 160B and 160E may be located in another data center 450Y, and nodes 160C and 160D may be located in yet another data center 450Z. The storage system 100 may also use additional data centers (not shown), and the data centers 450X-450Z may include additional storage nodes (not shown). A data center may be located at a particular geographical location and may host various resource pools, such as collections of physical and/or virtualized computer servers, storage devices, networking equipment and the like, that are used to implement and distribute the infrastructure and services offered by a provider network. The failure of one data center may largely be insulated from the failure of another data center.

In one embodiment, the nodes assigned to a partition according to shuffle sharding 110 may be distributed across the data centers 450X-450Z for enhanced availability and reliability, such that the data centers 450X-450Z represent an additional constraint on the shuffle sharding. For a particular partition, the shuffle sharding 110 may select one storage node from a set of nodes at the first data center 450X, a second storage node from a set of nodes at the second data center 450Y, and a third storage node from a set of nodes at the third data center 450Z. For example, the shuffle sharding 110 may select node 160A in data center 450X, node 160B in data center 450Y, and node 160D in data center 450Z for the first partition 140A. As another example, the shuffle sharding 110 may select node 160A in data center 450X, node 160E in data center 450Y, and node 160C in data center 450Z for the second partition 140B. As yet another example, the shuffle sharding 110 may select node 160F in data center 450X, node 160B in data center 450Y, and node 160C in data center 450Z for the third partition 140N.

Figure 5:
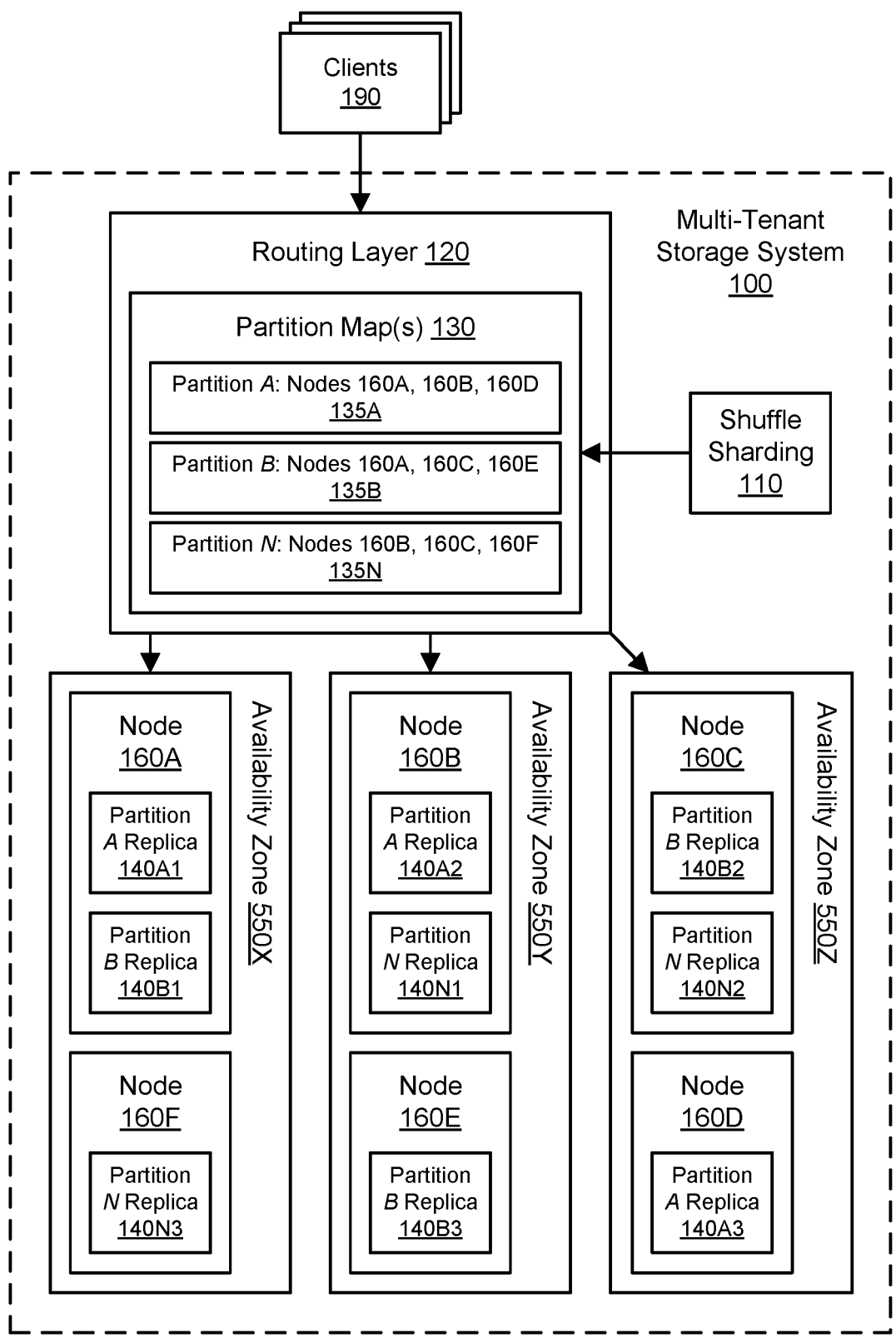
FIG. 5 illustrates further aspects of the example system environment for a cell-based storage system with failure isolation, including the distribution of storage nodes across different availability zones for fault tolerance, according to one embodiment.

FIG. 5 illustrates further aspects of the example system environment for a cell-based storage system with failure isolation, including the distribution of storage nodes across different availability zones for fault tolerance, according to one embodiment. Storage nodes 160A-160F may be maintained in different availability zones. For example, nodes 160A and 160F may be located in one availability zone 550X, nodes 160B and 160E may be located in another availability zone 550Y, and nodes 160C and 160D may be located in yet another availability zone 550Z. The storage system 100 may also use additional availability zones (not shown), and the availability zones 550X-550Z may include additional storage nodes (not shown). An availability zone may represent a logical region including one or more data centers. Because availability zones may represent broad regions with disparate infrastructures, the failure of one availability zone may largely be insulated from the failure of another availability zone.

In one embodiment, the nodes assigned to a partition according to shuffle sharding 110 may be distributed across the availability zones 550X-550Z for enhanced availability and reliability, such that the zones 550X-550Z represent an additional constraint on the shuffle sharding. For a particular partition, the shuffle sharding 110 may select one storage node from a set of nodes at the first availability zone 550X, a second storage node from a set of nodes at the second availability zone 550Y, and a third storage node from a set of nodes at the third availability zone 550Z. For example, the shuffle sharding 110 may select node 160A in availability zone 550X, node 160B in availability zone 550Y, and node 160D in availability zone 550Z for the first partition 140A. As another example, the shuffle sharding 110 may select node 160A in availability zone 550X, node 160E in availability zone 550Y, and node 160C in availability zone 550Z for the second partition 140B. As yet another example, the shuffle sharding 110 may select node 160F in availability zone 550X, node 160B in availability zone 550Y, and node 160C in availability zone 550Z for the third partition 140N.

Figure 6:
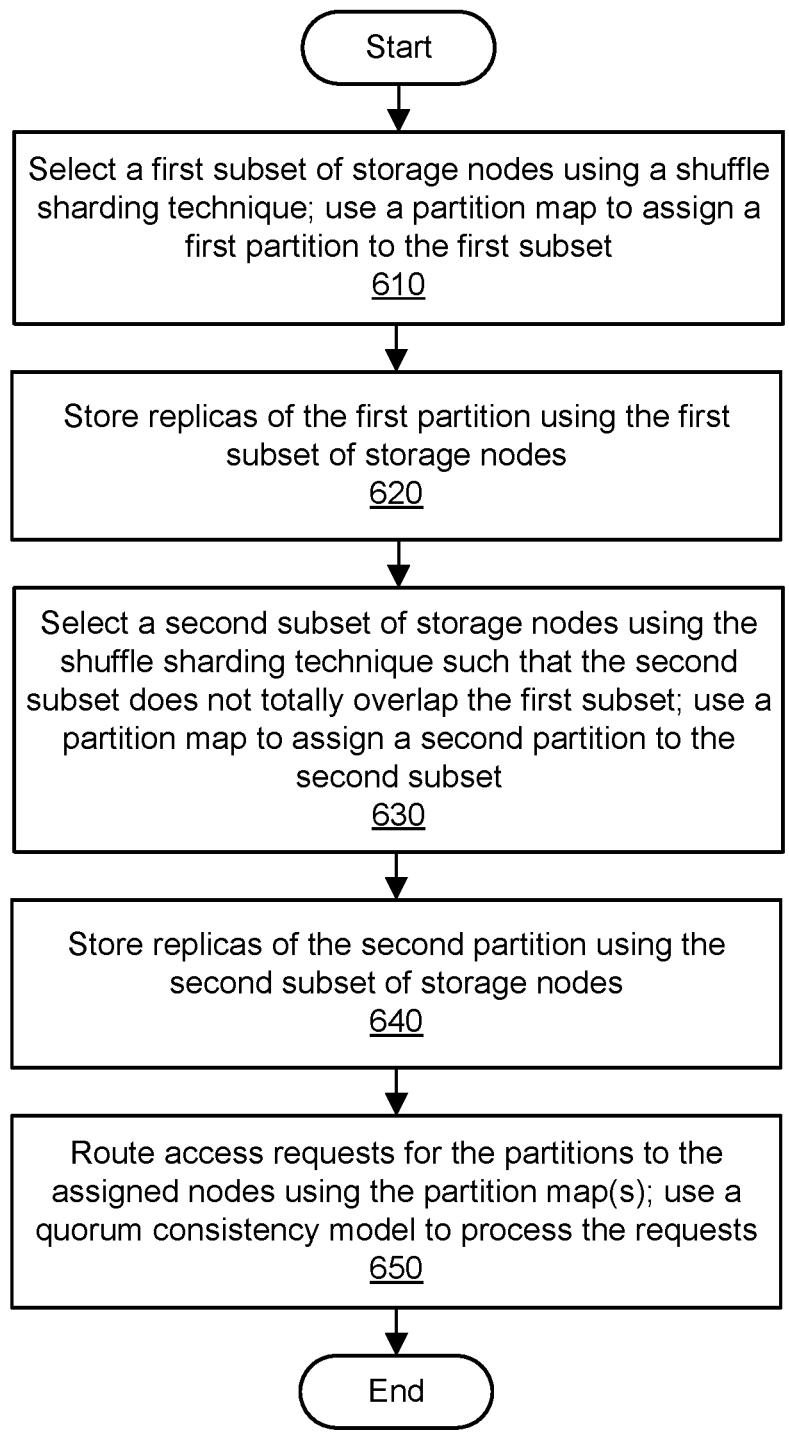
FIG. 6 is a flowchart illustrating a method for a cell-based storage system with failure isolation, according to one embodiment.

FIG. 6 is a flowchart illustrating a method for a cell-based storage system with failure isolation, according to one embodiment. A data store may include a set of storage nodes configured to store data objects. As shown in 610, a first subset of the storage nodes may be selected for a first partition. The first subset may represent a particular number of nodes, e.g., three. The first subset may be selected according to a shuffle sharding technique. In one embodiment, the shuffle sharding technique may select the first subset of storage nodes in light of other subsets selected for other partitions, e.g., to restrict an overlap with any other partition to a predetermined number of nodes (e.g., one node). The shuffle sharding may use random or pseudo-random selection on a first pass, with nodes potentially then being disqualified if they represent an excessive degree of overlap. In one embodiment, the shuffle sharding technique may select different nodes from different categories or locations, e.g., one node from a first data center, another node from another data center, and so on. Partitions may represent logical entities that are backed by replicas in the selected storage nodes. As also shown in 610, the first partition may be assigned to the first subset of storage nodes using a partition map.

As shown in 620, the first subset of storage nodes may be used to store replicas of the first partition. A replica may represent a copy of the partition, and initially the replicas may be substantially identical. In one embodiment, one replica of the partition may be stored using each of the selected storage nodes. A storage node may store replicas for multiple partitions, and performance problems attributed to one partition may affect the replicas of other partitions co-located on the same storage node.

As shown in 630, a second subset of the storage nodes may be selected for a second partition. The second subset may represent a particular number of nodes, e.g., three. The second subset may again be selected according to a shuffle sharding technique. The selection may be subject to one or more constraints. In one embodiment, the shuffle sharding technique may select the second subset of storage nodes in light of other subsets selected for other partitions, including the first subset, e.g., to restrict an overlap with any other partition to a predetermined number of nodes (e.g., one node). The shuffle sharding may use random or pseudo-random selection on a first pass, with nodes potentially then being disqualified if they represent an excessive degree of overlap. For example, if a candidate for the second subset would have excessive overlap with the first subset, then that candidate may be discarded, and the shuffle sharding may be used again until a suitable subset of storage nodes is found for the second partition. In one embodiment, the shuffle sharding technique may select different nodes for the second partition from different categories or locations, e.g., one node from a first data center, another node from another data center, and so on. In one embodiment, another constraint may be associated with a set of data centers or availability zones, such that the selected nodes are distributed across the data centers or zones. As also shown in 630, the second partition may be assigned to the second subset of storage nodes using a partition map. In various embodiments, the partition map used for the second partition may be the same as or different from the partition map used for the first partition.

As shown in 640, the second subset of storage nodes may be used to store replicas of the second partition. A replica of the second partition may represent a copy of data of the second partition, and initially the replicas may be substantially identical. In one embodiment, one replica of the second partition may be stored using each of the selected storage nodes. Again, a storage node may store replicas for multiple partitions, and performance problems attributed to one partition may affect the replicas of other partitions co-located on the same storage node.

As shown in 650, access requests for the first and second partitions may be routed to the appropriate storage nodes using the partition map(s) at a routing layer. The requests may represent read requests and/or write requests. A quorum consistency model may be used to process the requests. Using the quorum consistency model, read requests and write requests for a partition may be served using a quorum of the replicas for that partition. In one embodiment, the quorum may be defined as a majority or super-majority or other sufficient pre-determined percentage of the replicas. For example, if a partition is backed by three replicas, then two of the three replicas may represent a quorum. For example, if a read request for a key is sent by a client to the multi-tenant storage system, then the system may determine that the key is part of the first partition, determine the first subset of storage nodes that store replicas for the first partition, route read requests to those nodes, and generate a response to the client when a quorum of the nodes have responded. In one embodiment, a single failed or inaccessible node may not render a partition inaccessible as long as a quorum of nodes remain operational for that partition. Using the quorum consistency model, the customer experience may be based on the best-performing replicas for a partition and not necessarily on the worst-performing replica(s), such that the partition may be read from or written to even if one of its replicas is inaccessible or experiencing a high latency. By implementing the quorum consistency model with shuffle sharding in a cell-based architecture for storage, the failure (or inaccessibility) of one partition's storage resources may not make other partitions inaccessible.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multi-processor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of at least one computer-readable (i.e., computer-accessible) medium configured to store program instructions and data as described above for implementing embodiments of the corresponding methods and apparatus.

However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more computing devices configured to implement a multi-tenant storage system, wherein the multi-tenant storage system maintains a data store comprising a set of storage nodes, and wherein the multi-tenant storage system is configured to:
        select a first subset of two or more storage nodes from the set of storage nodes, wherein the first subset of storage nodes is assigned to a first partition of data using one or more partition maps, and wherein a plurality of replicas of the first partition are stored using the first subset of storage nodes;
        store a replica of the first partition at individual ones of the first subset of storage nodes;
        select a second subset of two or more storage nodes from the set of storage nodes, wherein the second subset of storage nodes is selected based at least in part on a membership of the first subset of storage nodes, wherein the second subset of storage nodes comprises an overlapping storage node that is present in the first subset of storage nodes, wherein the second subset of storage nodes comprises at least one storage node not present in the first subset of storage nodes, wherein the second subset of storage nodes is assigned to a second partition of data using the one or more partition maps, and wherein a plurality of replicas of the second partition are stored using the second subset of storage nodes;
        store a replica of the second partition at individual ones of the second subset of storage nodes;
        route, using the one or more partition maps, one or more access requests associated with the first partition of data to at least a portion of the first subset of storage nodes; and
        route, using the one or more partition maps, one or more access requests associated with the second partition of data to at least a portion of the second subset of storage nodes.

2. The system as recited in claim 1, wherein the first subset of storage nodes experiences a failure, and wherein the second partition is accessible after the failure using a quorum of the second subset of storage nodes.

3. The system as recited in claim 1, wherein the second subset of storage nodes is selected based at least in part on limiting an overlap with the first subset of storage nodes to a predetermined number of storage nodes.

4. The system as recited in claim 1, wherein the first subset of storage nodes is distributed across a plurality of data centers, and wherein the second subset of storage nodes is distributed across the plurality of data centers.

5. A computer-implemented method, comprising:
  selecting a first subset of two or more storage nodes from a set of storage nodes of a data store, wherein the first subset of storage nodes is assigned to a first partition of data, and wherein a plurality of replicas of the first partition are stored using the first subset of storage nodes;
  storing a replica of the first partition at individual ones of the first subset of storage nodes;
  selecting a second subset of two or more storage nodes from the set of storage nodes of the data store, wherein the second subset of storage nodes is selected based at least in part on a membership of the first subset of storage nodes, wherein the second subset of storage nodes comprises an overlapping storage node that is present in the first subset of storage nodes, wherein the second subset of storage nodes comprises at least one storage node not present in the first subset of storage nodes, wherein the second subset of storage nodes is assigned to a second partition of data, and wherein a plurality of replicas of the second partition are stored using the second subset of storage nodes;
  storing a replica of the second partition at individual ones of the second subset of storage nodes;
  routing one or more access requests associated with the first partition of data to at least a portion of the first subset of storage nodes; and
  routing one or more access requests associated with the second partition of data to at least a portion of the second subset of storage nodes.

6. The method as recited in claim 5, wherein the second subset of storage nodes is selected based at least in part on restriction of an overlap with the first subset of storage nodes.

7. The method as recited in claim 5, wherein the data store comprises a plurality of data sets, wherein requests to access the data store are routed using a plurality of partition maps, and wherein individual ones of the data sets are assigned to individual ones of the partition maps.

8. The method as recited in claim 5, wherein one of the access requests associated with the first partition of data is processed using a quorum of the first subset of storage nodes, and wherein one of the access requests associated with the second partition of data is processed using a quorum of the second subset of storage nodes.

9. The method as recited in claim 5, wherein the first subset of storage nodes experiences a failure, and wherein the second partition is accessible after the failure using a quorum of the second subset of storage nodes.

10. The method as recited in claim 9, wherein the failure results from a quantity of the one or more access requests associated with the first partition.

11. The method as recited in claim 5, wherein the first subset of storage nodes is distributed across a plurality of data centers, and wherein the second subset of storage nodes is distributed across the plurality of data centers.

12. The method as recited in claim 5, wherein the data store comprises a distributed hash table (DHT).

13. One or more non-transitory computer-readable storage media storing program instructions that, when executed on or across one or more processors, perform:
  selecting a first subset of two or more storage nodes from a set of storage nodes of a multi-tenant data store, wherein the first subset of storage nodes is assigned to a first partition of data, and wherein a plurality of replicas of the first partition are stored using the first subset of storage nodes;
  storing a replica of the first partition at individual ones of the first subset of storage nodes;
  selecting a second subset of two or more storage nodes from the set of storage nodes of the multi-tenant data store, wherein the second subset of storage nodes is selected based at least in part on a membership of the first subset of storage nodes, wherein the second subset of storage nodes comprises an overlapping storage node that is present in the first subset of storage nodes, wherein the second subset of storage nodes comprises at least one storage node not present in the first subset of storage nodes, wherein the second subset of storage nodes is assigned to a second partition of data, and wherein a plurality of replicas of the second partition are stored using the second subset of storage nodes;
  storing a replica of the second partition at individual ones of the second subset of storage nodes;
  routing one or more access requests associated with the first partition of data to at least a portion of the first subset of storage nodes; and
  routing one or more access requests associated with the second partition of data to at least a portion of the second subset of storage nodes.

14. The one or more non-transitory computer-readable storage media as recited in claim 13, wherein the second subset of storage nodes is selected based at least in part on constraining an overlap with the first subset of storage nodes.

15. The one or more non-transitory computer-readable storage media as recited in claim 14, wherein the overlap is determined based at least in part on a client-specific failure risk.

16. The one or more non-transitory computer-readable storage media as recited in claim 13, wherein the data store comprises a plurality of data sets, wherein requests to access the data store are routed using a plurality of partition maps, and wherein individual ones of the data sets are assigned to individual ones of the partition maps.

17. The one or more non-transitory computer-readable storage media as recited in claim 13, wherein one of the access requests associated with the first partition of data is processed using a quorum of the first subset of storage nodes, and wherein one of the access requests associated with the second partition of data is processed using a quorum of the second subset of storage nodes.

18. The one or more non-transitory computer-readable storage media as recited in claim 13, wherein the first subset of storage nodes experiences a failure, and wherein the second partition is accessible after the failure using a quorum of the second subset of storage nodes.

19. The one or more non-transitory computer-readable storage media as recited in claim 17, wherein the failure results from a quantity of the one or more access requests associated with the first partition.

20. The one or more non-transitory computer-readable storage media as recited in claim 13, wherein the first subset of storage nodes is distributed across a plurality of availability zones, and wherein the second subset of storage nodes is distributed across the plurality of availability zones.

* * * * *